United States Patent
Cantor et al.

(10) Patent No.: US 9,056,638 B2
(45) Date of Patent: Jun. 16, 2015

(54) TRACKED PLATFORM

(71) Applicant: Robo-Team Ltd., Tel-Aviv (IL)

(72) Inventors: Daniel Cantor, Tel-Aviv (IL); Yehonatan Asher, Tel-Aviv (IL); Mor Rotbart, Givataim (IL); Mark Vaynberg, Petach-Tikva (IL); Yosi Wolf, Tel-Aviv (IL); Elad Levy, Tel-Aviv (IL)

(73) Assignee: Robo-Team Ltd., Tel-Aviv (IL)

( * ) Notice: Subject to any disclaimer, the term of this patent is extended or adjusted under 35 U.S.C. 154(b) by 0 days.

(21) Appl. No.: 13/975,405

(22) Filed: Aug. 26, 2013

(65) Prior Publication Data

US 2014/0060943 A1 Mar. 6, 2014

Related U.S. Application Data

(60) Provisional application No. 61/693,792, filed on Aug. 28, 2012.

(51) Int. Cl.
*B62D 55/075* (2006.01)
*B62D 55/32* (2006.01)
*B25J 5/00* (2006.01)
*B62D 55/12* (2006.01)

(52) U.S. Cl.
CPC .............. *B62D 55/075* (2013.01); *B62D 55/32* (2013.01); *Y10T 29/49622* (2015.01); *B25J 5/005* (2013.01); *B62D 55/12* (2013.01)

(58) Field of Classification Search
USPC .................................................. 180/9.1–9.25
See application file for complete search history.

(56) References Cited

U.S. PATENT DOCUMENTS

| 7,581,605 | B2 * | 9/2009 | Caspi et al. ..................... 180/9.1 |
| 8,567,536 | B1 * | 10/2013 | Canfield et al. ................ 180/9.3 |
| 2011/0209930 | A1 * | 9/2011 | Brazier ........................... 180/9.1 |

* cited by examiner

*Primary Examiner* — Kevin Hurley

(57) ABSTRACT

A tracked platform, comprising: a main frame having a bottom side and a top side; a plurality of driving wheels mounted on said main frame; a continuous track mounted on said driving wheels; wherein a distance between said continuous track and said bottom side is between 20% and 45% of said driving wheel diameter and said bottom side is essentially concave.

7 Claims, 5 Drawing Sheets

TRACKED PLATFORM

RELATED APPLICATION

This application claims the benefit of priority under 35 USC 119(e) of U.S. Provisional Patent Application No. 61/693,792 filed Aug. 28, 2012, the contents of which are incorporated herein by reference in their entirety.

FIELD AND BACKGROUND OF THE INVENTION

The present invention, in some embodiments thereof, relates to tracked platforms with tracks and crawlers, and more particularly, but not exclusively, to terrain passage of a tracked platform.

Ground vehicles face many challenges when attempting mobility. Terrain can vary widely, including for example, loose and shifting materials, obstacles, vegetation, limited width openings, limited height openings, steps, uneven surfaces, tunnels, holes and the like. A variety of mobility configurations have been adapted to transverse difficult terrain. These options include legs, wheels and tracks. Legged robots can be agile, but use complex control mechanisms to move and achieve stability. Tracked vehicles have traditionally been configured in a tank-like configuration.

One key factor in the design of tracked ground vehicles and equipment such as robots, tanks, construction machinery, agricultural machinery and the like, is its weight. Heavy weight equipment must be provided with a powerful engine. Such equipment therefore entails high running costs due to the high fuel consumption as well a high maintenance costs. Generally, heavier vehicles sacrifice fuel consumption, speed, maneuvering, crossing and transportability capabilities.

SUMMARY OF THE INVENTION

The above describes shortcoming and therefore provides motivation to conceive the invention.

According to an aspect of some embodiments of the present invention there is provided a tracked platform, comprising: a main frame having a bottom side and a top side; a plurality of driving wheels mounted on the main frame; a continuous track mounted on the driving wheels; wherein a distance between the continuous track and the bottom side is between 20% and 45% of the driving wheel diameter and the bottom side is essentially concave.

Optionally, a distance between the continuous track and the top side is between 20% and 45% of the driving wheel diameter. Optionally, the top side is essentially concave. Optionally, a distance between middle of the continuous track and the bottom side is between 5% and 45% of the driving wheel diameter and a distance between middle of the continuous track and the top side is between 5% and 45% of the driving wheel diameter. Optionally, a distance between ends of the continuous track and the bottom side is bigger than the distance between middle of the continuous track and the bottom side. Optionally, the bottom side and the top side are symmetric. Optionally, the tracked platform further comprises lateral sides sized and shaped to preserve the distance between the continuous track and the bottom side. Optionally, the tracked platform further comprises at least one of a robotic arm and a flipper mounted on the main frame, wherein at least one of a robotic arm and a flipper is sized and shaped to preserve the distance between the continuous track and the bottom side. Optionally, the length of at least one of a robotic arm and a flipper is essentially the same as the length of the tracked platform.

According to an aspect of some embodiments of the present invention there is provided a method for manufacturing a tracked platform comprising: generating a main frame having a concave bottom side and a top side; mounting a plurality of driving wheels on the main frame; mounting a continuous track on the driving wheels; wherein a distance between the continuous track and the bottom side is between 20% and 45% of the driving wheel diameter.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
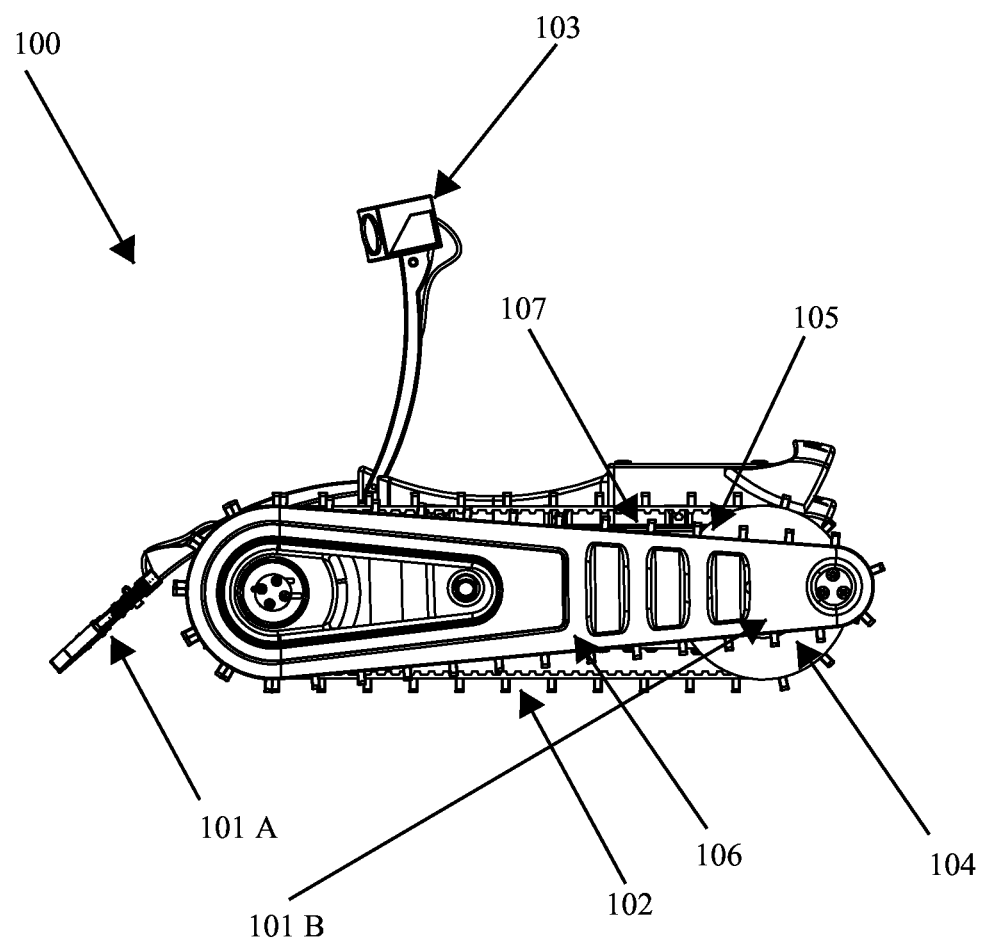
FIG. 1 is a 3D schematic view of a tracked platform and its bottom and top sides, according to some embodiment of the present invention.

The present invention, in some embodiments thereof, relates to tracked platforms with tracks and crawlers, and more particularly, but not exclusively, to terrain passage of a tracked platform.

The platform may be a robot, a tank, a tractor, a bulldozer, agricultural machinery, construction machinery and/or similar platforms. The platform comprises a main frame and at each side a continuous track that is extended along a pair of driving wheels and comprises multiple sub-tracks which are connected in a parallel manner, forming a niche for receiving the annular projections of the respective pair of driving wheels. The combination of the pair of driving wheels and the continuous track mobilizes the platform. The continuous track may be extended on wheels which are mounted on tiltable lateral arms of the platform which may be used for overcoming obstacles, such as stairs, for example as further described below.

The present invention, in some embodiments thereof, relates to the lateral sides of a tracked platform. The shape of the lateral sides preserves the distance between the continuous track and the platform's bottom side. The lateral sides' shape may be curved and the bottoms side and/or similar to the "infinity" sign, having round edges and a narrowing middle part.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Referring now to the drawings, FIG. 1 illustrates a 3D schematic view of a tracked platform 100 continuous tracks and its bottom 106 and top 105 sides, according to some embodiment of the present invention. As used herein, the term continuous track means a closed chain used for vehicle propulsion. A driving wheel 104 is mounted on the main frame 107 which interacts with the continuous track 102. As used herein, the term driving wheel means a wheel or a sprocket which receives torque from a power train and transfers it to a continuous track by physically grasping a continuous track thereby setting a continuous track into motion. The robotic platform 100 may have robotic arms 101A, 101B mounted on its side, top, front, back and/or bottom. As used herein, the term robotic arm means any mechanical arm connected to a main frame 107. The robotic arm 101A, 101B mobilization mechanism can be a continuous track and/or a different propulsion mechanism. The length of the robotic arms 101A, 101B may be essentially equal to the length of the main frame 107. The total length of the robotic arms 101A, 101 and the main frame 107 may be about 67 cm, which is the minimal length required for climbing a standard stair case by the robotic platform 100 which has two points of contact with the stairs. The distance between the continuous track 102 and the bottom side 106 is between 20% and 45% of the driving wheel 104 diameter. The distance between the continuous track 102 and the top side 105 is between 5% and 45% of said driving wheel 104 diameter. For example, the distance between the continuous track 102 and the tracked platform's bottom side 106 is 1.3 cm in the middle and 2.8 on either side and the driving wheel 104 diameter is 11.6 cm. The distance between the continuous track 102 and the bottom side 106 may be created by shaping the platform as an infinity sign, i.e. a platform with a narrow middle region and wider end regions on both sides of the middle region. The distance between the ends of the continuous track 102 and the bottom side 106 may be bigger than the distance between the middle of the continuous track 102 and said bottom side 106. A platform shape that creates that distance may reduce the platform weight. The distance between the continuous track 102 and the bottom side 106 may be the minimal distance required for climbing a standard staircase of about 27.5 to 50 degrees, 6 inch to 9.5 inch rise and 11.5 inch to 8 inch tread. For example, the distance between the continuous track 102 and the bottom side 106 is about 2 cm. The distance between the middle of the continuous track 102 and the bottom side 106 is between 20% and 45% of the driving wheel 104 diameter. The distance between middle of the continuous track 102 and the top side 106 is between 5% and 45% of said driving wheel 104 diameter. The main frame bottom side 106 may be essentially concave. The main frame top side 105 may be essentially concave. The concave shape may be smooth, angular and/or a combination thereof. The robotic platform may optionally have an image sensor 103, mounted on the platform mounted directly or by a moving or a static carrier. The tracked platform may be a robotic platform, a tank, a tractor, a bulldozer, agricultural machinery, construction machinery and similar platforms. Optionally, the distance between the continuous track 102 and the top side 105 is between 20% and 45% of the driving wheel 104 diameter. Optionally, the tracked platform 100 has one or more robotic arms 101A, 101B sized and shaped to preserves the distance between the continuous track 102 and the top side 105. Optionally, the tracked platform 100 has one of more flippers sized and shaped to preserves the distance between the continuous track 102 and the top side 105.

Figure 2:
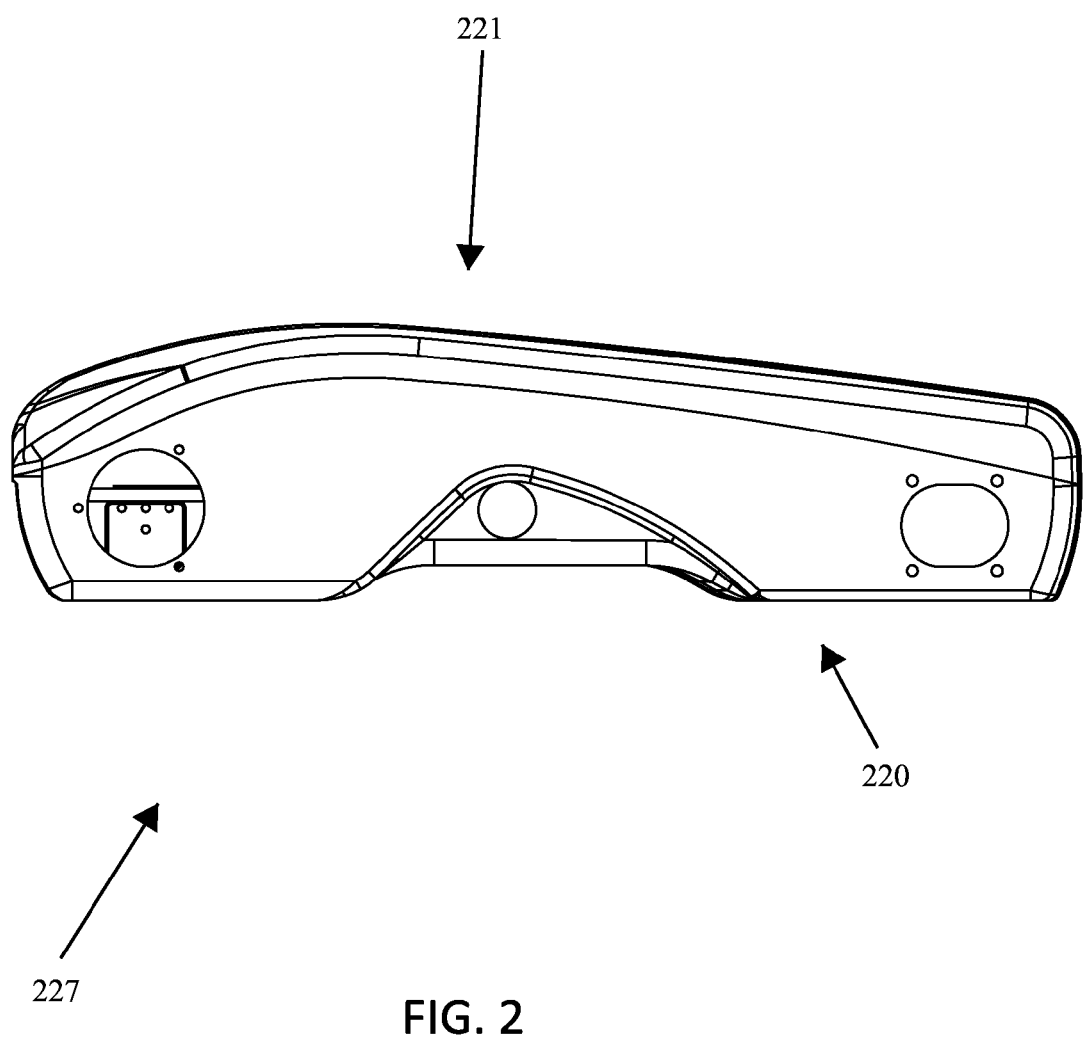
FIG. 2 is a schematic lateral view of the lateral side, according to some embodiment of the present invention.

Reference is now made to FIG. 2 which illustrates a schematic lateral view of the lateral side 227, according to some embodiment of the present invention. The lateral side 227 is sized and shaped to preserve some and/or all of the distance between the continuous track and the bottom side 220. The lateral side 227 may be sized and shaped to fit the structural and/or functional roles of the top side 221. For example, the top side 221 may be aerodynamic and the lateral side 227 size and shape may be sized and shaped to preserve the aerodynamic property of the combined shape of the platform and the lateral side 227. Optionally, the lateral side 227 size and/or shape reduce its weight thereby contributing to a better mobility of the tracked platform. Optionally, the distance between the continuous track and the bottom side 220 increases the ability of the tracked platform to pass through a rough terrain. Optionally, the lateral side 227 is sized and shaped to preserve the distance between the continuous track and the bottom side 220.

Figure 3:
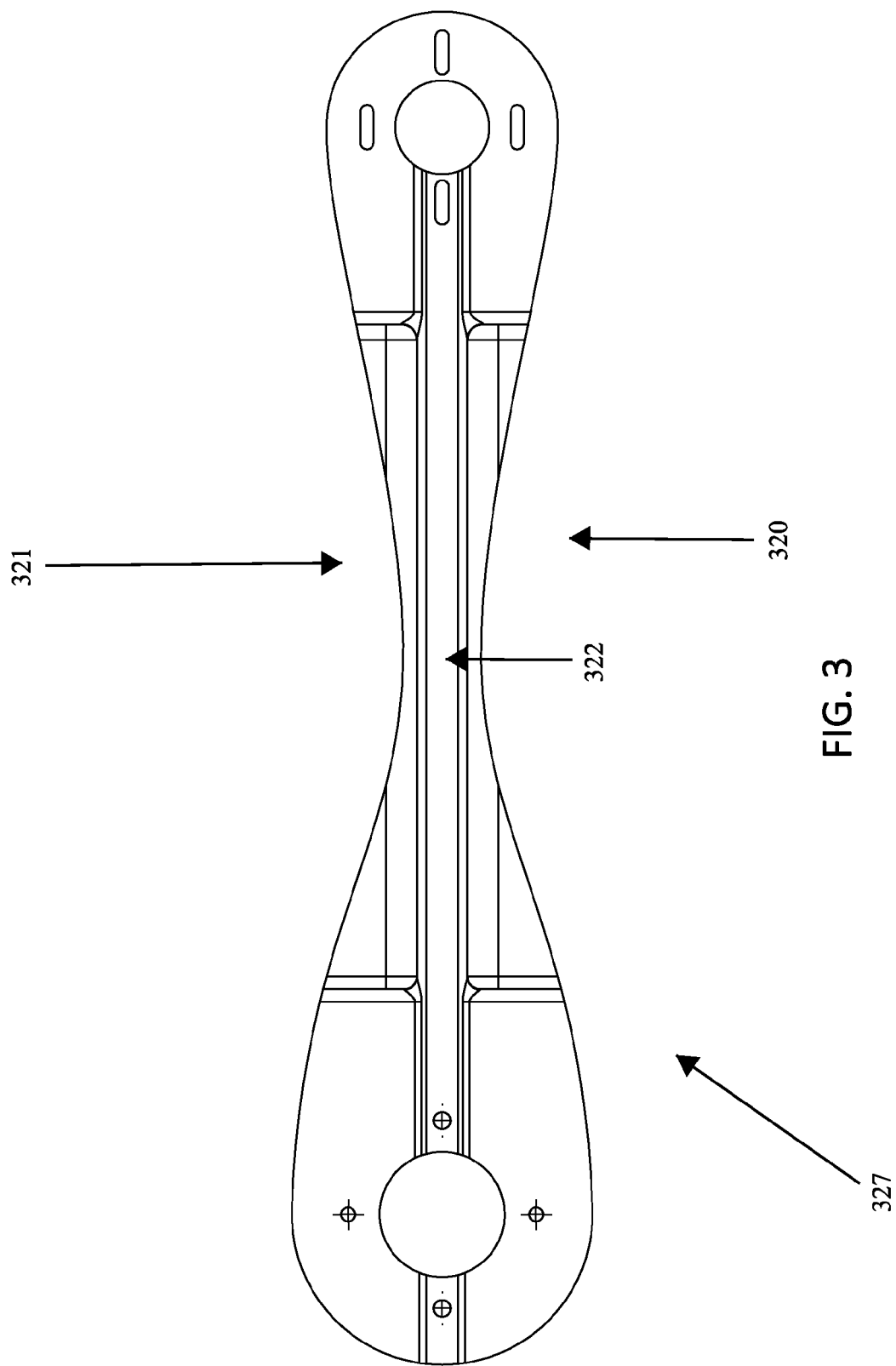
FIG. 3 is a schematic lateral view of an infinity shaped part of a tracked platform, according to some embodiment of the present invention.

Reference is now made to FIG. 3, which illustrates a schematic lateral view of an infinity shaped part of a tracked platform, according to some embodiment of the present invention. The depicted part 327 may be a lateral side sized and shaped to preserve some or all of the distance between the continuous track and the bottom side 320. The lateral side's 327 size and shape may preserve some or essentially all of the distance between the continuous track and the top side 321. Optionally, a flexible continuous track is mounted on the infinity shaped part 327. The continuous track may flex towards the narrow part of the infinity shape 322 upon climbing over an obstacle, and/or application of external pressure. The depicted part 327 may be a flipper sized and shaped to preserve some or all of the distance between the continuous track and the bottom side 320. Optionally, the flipper 327 preserves the distance between the lateral side's distance between the continuous track and the bottom side 320. Optionally, the flipper 327 preserves the distance between the lateral side's distance between the continuous track and the top side 321. Optionally, the bottom side 320 and the top side 321 of the depicted infinity shaped part 327 are symmetric. Optionally, the bottom side 320 and the top side 321 symmetry enable the tracked platform to flip bottom to top and function in a similar manner in both configurations.

Figure 4:
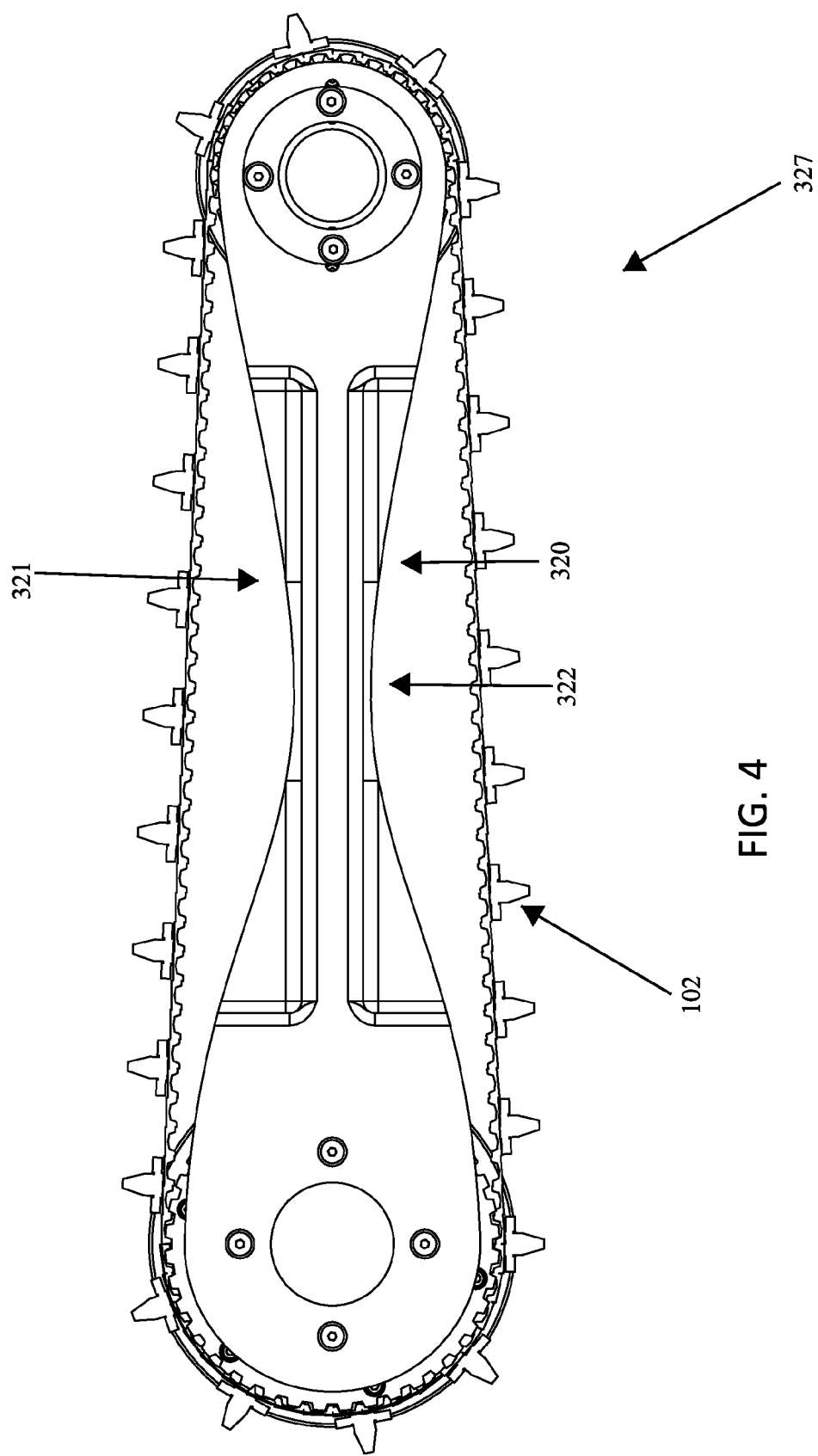
FIG. 4 is an infinity shaped part of a tracked platform encircled with a continuous track, according to some embodiment of the present invention.

Reference is now also made to FIG. 4, an infinity shaped part 327 of a tracked platform encircled with a continuous track 102, according to some embodiment of the present invention. The depicted part 327 may be a robotic arm and/or a flipper as described in FIG. 3.

Figure 5:
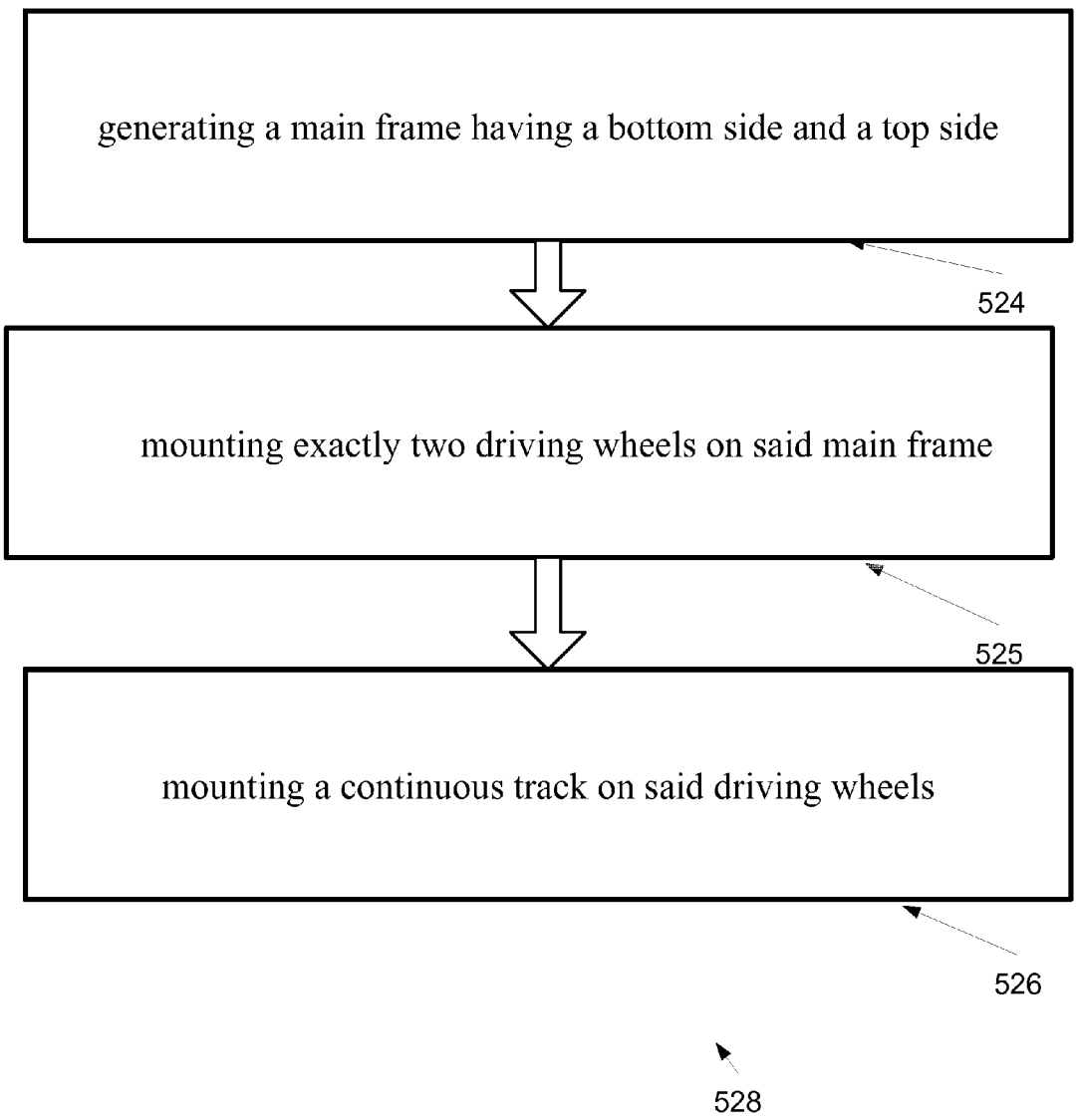
FIG. 5 is a schematic illustration of the process for manufacturing a tracked platform, according to some embodiment of the present invention.

Reference is now also made to FIG. 5, which is a flowchart of a method 528 for manufacturing a tracked platform, according to some embodiment of the present invention. First, as shown at 524, a main frame, having concave bottom side and a top side, is generated. Then, as shown at 525, a plurality of driving wheels is mounted on the main frame. Then, as shown at 526, a continuous track is mounted on the driving wheels. The distance between the continuous track and the bottom side is between 20% and 45% of the driving wheel diameter.

According to an aspect of some embodiments of the present invention, a reliability of the continuous track is increased as measured by the chances of it being thrown off a driving wheel, get stuck or otherwise become unable to mobilize a platform. The annular projections of the driving wheels can fit into niches between sub-tracks. This structure can centralize the tracks in a way that increase tracks' reliability.

According to an aspect of some embodiments of the present invention, the main frame is shaped with opposite central (upper and lower) niches, for example forming a shape similar to the sign infinity "∞". Optionally, lateral protection covers are also shaped with opposing niches to enable stretching the continuous track and to prevent a collision between the continuous track and the main frame and/or the lateral covers. This shape enables the tracked platform to climb stairs and/or other vertical obstacles, for example stairs, as it prevents collisions between the narrow part of the infinity shape with the vertical obstacle and it maximizes the contact with the terrain on both sides of the vertical obstacle. The shape may reduce the weight of the main frame compared to a similar main frame without an infinity shape. The infinity shape may allow the tracked platform to flip and reverse the top and bottom sides.

It is expected that during the life of a patent maturing from this application many relevant tracked platforms and gripping teeth will be developed and the scope of the terms tracked platform and teeth is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A tracked platform, comprising:
   a main frame having an essentially concave bottom side and an essentially concave top side, wherein said main frame comprises a power train;
   a plurality of rear driving wheels and a plurality of front driving wheels mounted on said main frame, where at least one of said plurality of rear driving wheels and said plurality of front driving wheels receives torque form said power train;
   a plurality of continuous tracks each mounted on one of said plurality of front driving wheels and one of said plurality of rear driving wheels;
   a plurality of robotic arms mounted on said main frame concentrically with an axle of said plurality of front driving wheels, wherein the length of each of said plurality of robotic arms is essentially the same as the length of said tracked platform;
   wherein a first distance between a bottom middle region of each one of said plurality of continuous tracks and said bottom side and a second distance between a top middle region each one of said plurality of continuous tracks and said top side is between 20% and 45% of a driving wheel diameter of any of said plurality of front driving wheels;
   wherein said bottom middle region and said top middle region are essentially equally distant from outer limits of one of said plurality of rear driving wheels and one of said plurality of front driving wheels;
   wherein said plurality of robotic arms are sized and shaped to preserve said first distance and said second distance.

2. The tracked platform of claim 1, wherein each one of said first and second distances is between 5% and 45% of said driving wheel diameter.

3. The tracked platform of claim 1, wherein said first distance is greater than said second distance.

4. The tracked platform of claim 1, wherein said bottom side and said top side are symmetric.

5. The tracked platform of claim 1, further comprising lateral sides sized and shaped to preserve said first distance and said second distance.

6. A method for manufacturing a tracked platform comprising:
   generating a main frame having an essentially concave bottom side and an essentially concave top side, wherein said main frame comprises a power train;
   mounting a plurality of rear driving wheels and a plurality of front driving wheels on said main frame, where at least one of said plurality of rear driving wheels and said plurality of front driving wheels receives torque form said power train;
   mounting a plurality of continuous tracks each on one of said plurality of front driving wheels and one of said plurality of rear driving wheels;
   mounting a plurality of robotic arms mounted on said main frame concentrically with an axle of said plurality of front driving wheels, wherein the length of each of said plurality of robotic arms is essentially the same as the length of said tracked platform;
   wherein a first distance between a bottom middle region of each one of said plurality of continuous tracks and said bottom side and a second distance between a top middle region each one of said plurality of continuous tracks and said top side is between 20% and 45% of a driving wheel diameter of any of said plurality of front driving wheels;
   wherein said bottom and top middle regions are essentially equally distant from outer limits of one of said plurality of rear driving wheels and one of said plurality of front driving wheels;
   wherein said plurality of robotic arms is sized and shaped to preserve said first distance and said second distance.

7. The tracked platform of claim 1, wherein each lateral side of said main frame has round edges and a narrowing middle part forming an infinity shape.

* * * * *